United States Patent
Aoshima et al.

(10) Patent No.: US 9,430,989 B2
(45) Date of Patent: Aug. 30, 2016

(54) IMAGE DISPLAY CONTROL APPARATUS, IMAGE DISPLAY APPARATUS, NON-TRANSITORY COMPUTER READABLE MEDIUM, AND IMAGE DISPLAY METHOD FOR DISPLAYING IMAGES ON A DIVIDED DISPLAY

(71) Applicant: FUJI XEROX CO., LTD., Minato-ku, Tokyo (JP)

(72) Inventors: Yuzo Aoshima, Tokyo (JP); Yuki Okabe, Tokyo (JP); Chinatsu Hisamoto, Tokyo (JP); Yasushi Ichinowatari, Kanagawa (JP); Tomohito Takagi, Kanagawa (JP); Yu Mishima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 312 days.

(21) Appl. No.: 13/859,305

(22) Filed: Apr. 9, 2013

(65) Prior Publication Data

US 2014/0092136 A1   Apr. 3, 2014

(30) Foreign Application Priority Data

Sep. 28, 2012   (JP) ................. 2012-218678

(51) Int. Cl.
| | |
|---|---|
| G09G 5/14 | (2006.01) |
| G06F 3/041 | (2006.01) |
| G09G 5/373 | (2006.01) |
| G06T 3/20 | (2006.01) |
| G06F 3/0485 | (2013.01) |
| G09G 5/34 | (2006.01) |

(52) U.S. Cl.
CPC ............... *G09G 5/14* (2013.01); *G06F 3/0412* (2013.01); *G06F 3/0485* (2013.01); *G06T 3/20* (2013.01); *G06F 2203/04806* (2013.01); *G09G 5/346* (2013.01); *G09G 5/373* (2013.01); *G09G 2340/02* (2013.01); *G09G 2340/0492* (2013.01)

(58) Field of Classification Search
CPC .......... G06T 3/20; G09G 5/34; G09G 5/343; G09G 5/346
See application file for complete search history.

(56) References Cited

U.S. PATENT DOCUMENTS

| | | | |
|---|---|---|---|
| 2009/0021592 A1* | 1/2009 | Oyama et al. | 348/220.1 |
| 2011/0025711 A1 | 2/2011 | Doi | |
| 2012/0242685 A1* | 9/2012 | Ohtake | 345/619 |

FOREIGN PATENT DOCUMENTS

| | | |
|---|---|---|
| JP | 2008-20901 A | 1/2008 |
| JP | 2011-33870 A | 2/2011 |
| JP | 2012-058979 A | 3/2012 |

OTHER PUBLICATIONS

Communication dated Oct. 27, 2015 from the Japanese Patent Office in counterpart application No. 2012-218678.

* cited by examiner

*Primary Examiner* — Jeffery A Brier
(74) *Attorney, Agent, or Firm* — Sughrue Mion, PLLC

(57) ABSTRACT

An image display control apparatus includes a division unit and a display controller. The division unit divides a rectangular display area into plural rectangular sub-areas in a direction in which one side of the display area extends. The display controller performs display control to enlarge or reduce rectangular images so that while aspect ratios of the images are maintained, a length of each of the sub-areas in the direction in which the one side of the display area extends is equal to or substantially equal to a length of each of the images in the direction in which the one side of the display area extends, and to display at least some of the enlarged or reduced images in the sub-areas.

14 Claims, 8 Drawing Sheets

IMAGE DISPLAY CONTROL APPARATUS, IMAGE DISPLAY APPARATUS, NON-TRANSITORY COMPUTER READABLE MEDIUM, AND IMAGE DISPLAY METHOD FOR DISPLAYING IMAGES ON A DIVIDED DISPLAY

CROSS-REFERENCE TO RELATED APPLICATIONS

This application is based on and claims priority under 35 USC 119 from Japanese Patent Application No. 2012-218678 filed Sep. 28, 2012.

BACKGROUND (i) Technical Field

The present invention relates to an image display control apparatus, an image display apparatus, a non-transitory computer readable medium, and an image display method. More specifically, the present invention relates to an image display control apparatus for performing display control to display plural images, an image display apparatus including the image display control apparatus, a non-transitory computer readable medium storing a program executed by the image display control apparatus, and an image display method for displaying plural images.

(ii) Related Art

There may be a demand for an electronic apparatus having a display, such as a mobile phone terminal apparatus or an information processing apparatus, to display plural images identified by image information stored therein or image information or the like stored in an external device accessible therefrom in a list on the display.

By way of example, as illustrated in FIG. 8, images to be displayed in a list using an electronic apparatus may have different sizes and aspect ratios.

One method for displaying such images in a display area of the electronic apparatus at a time is to divide the display area into a matrix of sub-areas having the same size and aspect ratio, and to display an image to be displayed in each of the sub-areas in an enlarged or reduced manner so that the images are inscribed in the individual sub-areas and the aspect ratios of the images are maintained.

In this method, however, for example, as illustrated in the left part of FIG. 9, some of the images may be reduced in size and made less visible. The left part of FIG. 9 illustrates the case where the images illustrated in FIG. 8 are displayed in one display area.

In contrast, for example, as illustrated in the right part of FIG. 9, an image having a small size may be displayed in an enlarged manner, in which case a time-consuming operation may be required for the enlarged display.

SUMMARY

According to an aspect of the invention, there is provided an image display control apparatus including a division unit and a display controller. The division unit divides a rectangular display area into plural rectangular sub-areas in a direction in which one side of the display area extends. The display controller performs display control to enlarge or reduce rectangular images so that while aspect ratios of the images are maintained, a length of each of the sub-areas in the direction in which the one side of the display area extends is equal to or substantially equal to a length of each of the images in the direction in which the one side of the display area extends, and to display at least some of the enlarged or reduced images in the sub-areas.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail hereinafter with reference to the drawings. In the following exemplary embodiment, a smartphone will be described by way of non-limiting example. It is to be understood that the following exemplary embodiment may also apply to any other device having a display screen, such as a mobile phone, a personal digital assistant (PDA), or a portable game console.

Figure 1:
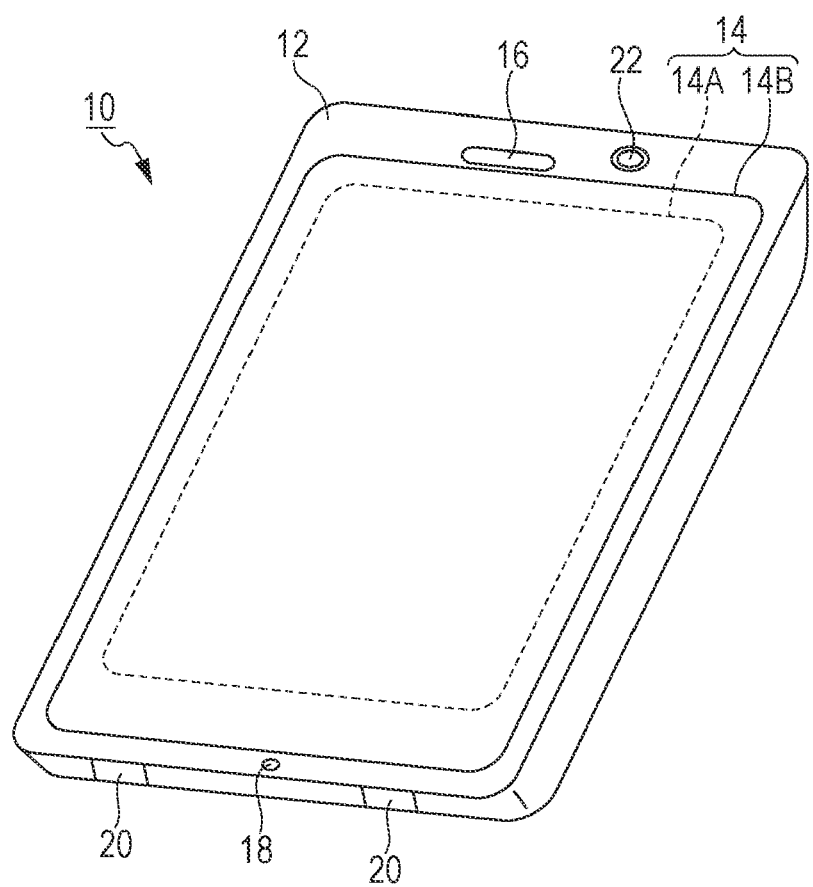
FIG. 1 is a perspective view illustrating the external appearance of a smartphone according to an exemplary embodiment.

Referring to FIG. 1, a smartphone 10 has a flat housing 12, and includes, on a surface of the housing 12, a display input unit 14 having a display panel 14A serving as a display and an operation panel 14B serving as an input unit. The display panel 14A and the operation panel 14B are formed into a single unit. The housing 12 includes a speaker 16, a microphone 18, operation units 20, and a camera unit 22. The configuration of the housing 12 is not limited to that described above, and, for example, a folding housing or a sliding housing may also be used.

Figure 2:
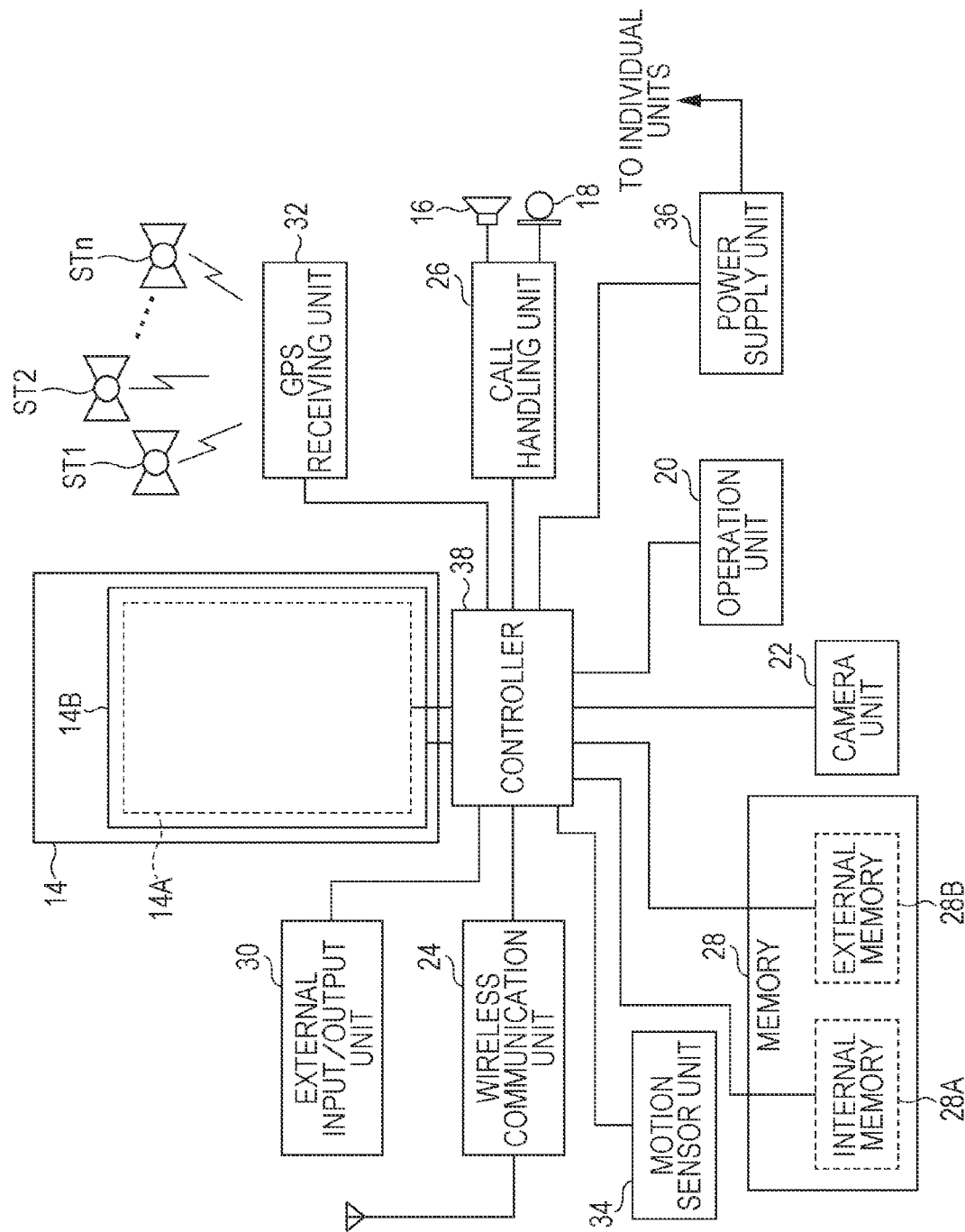
FIG. 2 is a block diagram illustrating the configuration of the smartphone according to the exemplary embodiment.

As illustrated in FIG. 2, the smartphone 10 includes a wireless communication unit 24, the display input unit 14, a call handling unit 26, the operation unit 20, the camera unit 22, a memory 28, and an external input/output unit 30. The smartphone 10 further includes a global positioning system (GPS) receiving unit 32, a motion sensor unit 34, a power supply unit 36, and a controller 38. Further, the smartphone 10 has a wireless communication function for performing mobile wireless communication via a base station device and a mobile communication network.

The wireless communication unit 24 is configured to perform wireless communication with a base station device included in a mobile communication network in accordance with an instruction of the controller 38. Using the wireless communication, the wireless communication unit 24 transmits and receives various file data such as speech data and image information, electronic mail data, and the like, and receives web data, streaming data, and so forth.

The display input unit 14 may be a touch panel display that displays images (still images and moving images), text information, and so forth to visually present information to the user and that detects a user operation on the displayed information under control of the controller 38. The display input unit 14 includes the display panel 14A and the operation panel 14B.

The display panel 14A may employ a liquid crystal display (LCD), an organic electro-luminescence display (OELD), or the like as a display apparatus. The operation panel 14B is a device disposed to allow the user to visually recognize an image displayed on a display surface of the display panel 14A and configured to detect the coordinates of one or more operations made by user's finger or touch pen. When this device is operated with a user's finger or touch pen, a detection signal generated in accordance with the operation is output to the controller 38. The controller 38 then detects the position (coordinates) of the operation on the display panel 14A in accordance with the received detection signal.

The size of the display area may or may not exactly coincide with the size of the display panel 14A. Examples of the position detection method employed for the operation panel 14B may include a matrix switch method, a resistive method, a surface acoustic wave method, an infrared method, an electromagnetic induction method, and an electrostatic capacitive method, and any of them may be used.

The call handling unit 26 includes the speaker 16 and the microphone 18, and is configured to convert user speech input through the microphone 18 into speech data processible by the controller 38 and output the speech data to the controller 38, or decode speech data received by the wireless communication unit 24 or the external input/output unit 30 and output the decoded speech data from the speaker 16. For example, the speaker 16 may be disposed on the same surface as the surface on which the display input unit 14 is disposed in the manner illustrated in FIG. 1, and the microphone 18 may be disposed on a side surface of the housing 12.

The operation units 20 are configured to receive an instruction given by the user. For example, as illustrated in FIG. 1, the operation units 20 may push-button switches disposed on a side surface of the housing 12 of the smartphone 10 and turned on when pressed by finger or the like and turned off, when released, due to the restoring force of a spring or the like.

The memory 28 is configured to store control programs and control data of the controller 38, application software, address data including the name, telephone number, and so forth of the communication partner which are associated with one another, data of transmitted and received electronic mails, web data downloaded by web browsing, and downloaded content data and also temporarily store streaming data and the like. The memory 28 includes a built-in internal memory 28A of the smartphone 10 and a detachable external memory 28B having an external memory slot. Each of the internal memory 28A and the external memory 28B of the memory 28 may be implemented using any type of suitable storage medium including a flash memory type, a hard disk type, a multimedia card micro type, a memory card type (such as MicroSD (registered trademark) memory), a random access memory (RAM), and a read only memory (ROM).

The external input/output unit 30 serves as an interface with all the external devices connected to the smartphone 10, and is used for direct or indirect connection with other external devices via communication (e.g., universal serial bus (USB) or Institute of Electrical and Electronics Engineers (IEEE) 1394 communication) or a network (e.g., the Internet, wireless local area network (LAN), Bluetooth (registered trademark), radio frequency identification (RFID), infrared data association (IrDA) (registered trademark), ultra wideband (UWB) (registered trademark), or ZigBee (registered trademark)).

Examples of the external devices connected to the smartphone 10 include a wired/wireless headset, a wired/wireless external charger, a wired/wireless data port, a card connected through a card socket, such as a memory card, a subscriber identity module (SIM) card, or a user identity module (UIM) card, an external audio/video device connected through an audio/video input/output (I/O) terminal, an external audio/video device connected by a wireless link, a smartphone connected to a wired/wireless network, a personal computer connected to a wired/wireless network, a PDA connected to a wired/wireless network, and an earphone. The external input/output unit 30 may transmit data received from the external devices to the internal components of the smartphone 10 and transmit internal data of the smartphone 10 to the external devices.

The GPS receiving unit 32 receives GPS signals transmitted from GPS satellites ST1 to STn, and executes a position measurement calculation process based on the received plural GPS signals to detect the position (in latitude, longitude, and altitude) of the smartphone 10 in accordance with an instruction of the controller 38. If the GPS receiving unit 32 is allowed to acquire position information from the wireless communication unit 24 or the external input/output unit 30 (e.g., a wireless LAN), the GPS receiving unit 32 may detect the position of the smartphone 10 using the acquired position information.

The motion sensor unit 34 includes, for example, a three-axis acceleration sensor and so forth, and is configured to detect a physical movement of the smartphone 10 in accordance with an instruction of the controller 38. By detecting a physical movement of the smartphone 10, the motion sensor unit 34 may detect the movement direction and acceleration of the smartphone 10. The detection results are output to the controller 38.

The power supply unit 36 is configured to supply power stored in a battery (not illustrated) to the individual components of the smartphone 10 in accordance with an instruction of the controller 38.

The controller 38 includes a microprocessor, and is configured to operate in accordance with the control programs and control data stored in the memory 28 to collectively control the individual components of the smartphone 10. Further, the controller 38 has a mobile communication control function for controlling the individual units of a communication system and an application processing function in order to perform speech communication and data communication via the wireless communication unit 24.

The application processing function may be implemented by the operation of the controller 38 in accordance with the application software stored in the memory 28. Examples of the application processing function include an infrared communication function for controlling the external input/output unit 30 to perform data communication with a counterpart device, an electronic mail function for transmitting and receiving electronic mails, and a web browsing function for viewing web pages.

The controller 38 also has an image processing function for, for example, displaying video on the display input unit 14 based on image information (still image data or moving image data) such as received data or downloaded streaming data. The image processing function is a function in which the controller 38 decodes the image information and performs image processing on the decoded image information to display an image on the display input unit 14.

Further, the controller 38 executes display control for the display panel 14A and operation detection control for detecting a user operation through the operation units 20 and the operation panel 14B.

By executing the display control, the controller 38 displays an operation unit implemented in software, such as an icon to start the application software or a scroll bar, or displays a window for creating an electronic mail. The scroll bar is an operation unit implemented in software for receiving an instruction to move a displayed part of an image which is too large to be accommodated in the display area of the display panel 14A.

By executing the operation detection control, the controller 38 detects user operations made through the operation units 20, receives an operation on the icon described above or an input of a character string to an input field on the window described above through the operation panel 14B, or receives a request for scrolling a displayed image with the scroll bar.

By executing the operation detection control, furthermore, the controller 38 determines whether the position at which the operation panel 14B was operated is located in a superimposition part (display area) that overlaps the display panel 14A or in a non-superimposition, outer peripheral part (non-display area) that does not overlap the display panel 14A. The controller 38 has a touch panel control function for controlling a touch-sensitive area of the operation panel 14B and the displayed position of the operation unit implemented in software.

The controller 38 may also detect a gesture made to the operation panel 14B, and implement a preset function in accordance with the detected gesture. A gesture is not an existing simple touch but a more complex action such as rendering a trail of a finger or the like across the operation panel 14B, simultaneously specifying plural positions on the operation panel 14B, or a combination thereof to render a trail of the finger or the like regarding at least one of the plural positions.

The camera unit 22 may be a digital camera configured to electronically capture an image using an imaging element such as a complementary metal oxide semiconductor (CMOS) or charge-coupled device (CCD) sensor. The camera unit 22 is also configured to convert image information obtained by image capture into compressed image information such as JPEG (Joint Photographic Experts Group) image data under control of the controller 38, and record the resulting image data in the memory 28 or output the resulting image data through the external input/output unit 30 or the wireless communication unit 24. In the smartphone 10 illustrated in FIG. 1, the camera unit 22 is disposed on the same surface as the surface on which the display input unit 14 is disposed. Instead, the camera unit 22 may be disposed on the rear surface of the display input unit 14, or, alternatively, multiple camera units 22 may be disposed. If multiple camera units 22 are disposed, the camera units 22 may be used independently by switching from one to another to capture images, or the multiple camera units 22 may be used simultaneously to capture images.

The camera unit 22 may also be used for various functions of the smartphone 10. For example, an image captured with the camera unit 22 may be displayed on the display panel 14A, or an image obtained by the camera unit 22 may be used as an operation input tool of the operation panel 14B. Further, the GPS receiving unit 32 may refer to an image obtained by the camera unit 22 to detect a position. In addition, the optical axis direction of the camera unit 22 of the smartphone 10 may be determined or current use conditions may be determined by referring to an image obtained by the camera unit 22, without using the three-axis acceleration sensor or along with the three-axis acceleration sensor. An image obtained by the camera unit 22 may also be used in the application software.

Additionally, position information acquired by the GPS receiving unit 32, speech information (which may be subjected to speech-to-text conversion to obtain text information by using the controller 38 or the like) acquired by the microphone 18, attitude information acquired by the motion sensor unit 34, and any other desired information may be added to image information of a still image or a moving image, and the image information having such information may be recorded on the memory 28 or output through the external input/output unit 30 or the wireless communication unit 24.

In the smartphone 10 according to this exemplary embodiment, at least one of the internal memory 28A and the external memory 28B stores image information. When an instruction for displaying the image information in a list is given by user operation, the smartphone 10 performs control to display the list on the display panel 14A. This control allows the user to check plural images on the same screen, which may be useful.

Images represented by image information obtained by image capture and images represented by image information input via the external input/output unit 30 or the like may not necessarily be uniform in shape and size.

In the smartphone 10, when these image are displayed in a list on the same screen, the display area of the display panel 14A, which is formed in a rectangular shape, is divided into sub-areas in a predetermined direction (in this exemplary embodiment, up-down direction in front view). In the smartphone 10, furthermore, each of images to be displayed is displayed in an enlarged or reduced manner so that the length of the image in the up-down direction in front view is equal to or substantially equal to the length of each of the sub-areas in the up-down direction in front view. This may ensure that the length of the sides of each image in at least one direction is maintained at a certain value even though the image is displayed in an enlarged or reduced manner, and may prevent a reduction in visibility when plural images are displayed side by side.

Figure 3:
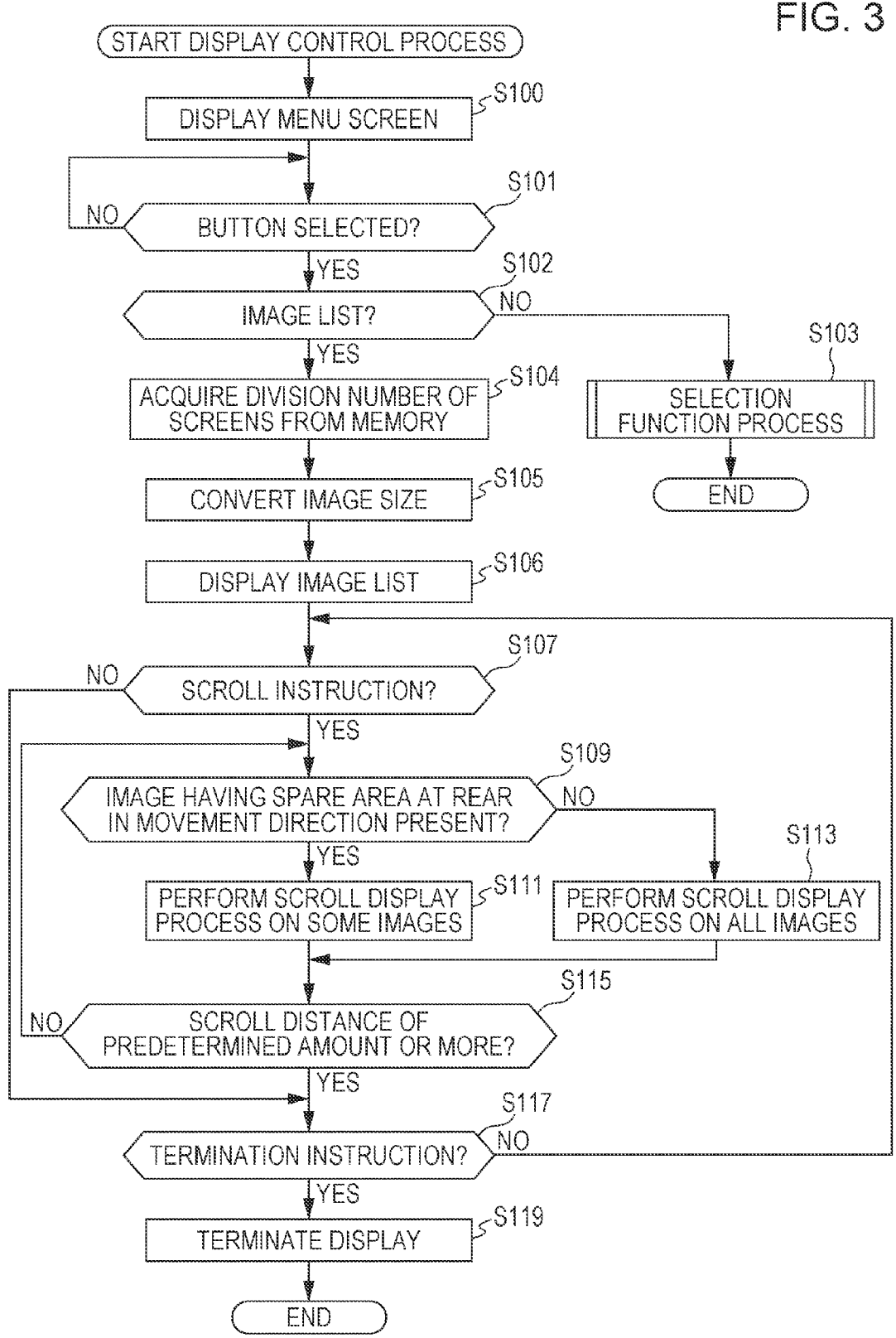
FIG. 3 is a flowchart illustrating a processing procedure of a display control processing program according to the exemplary embodiment.

The operation of the smartphone 10 according to this exemplary embodiment will be described with reference to FIG. 3. FIG. 3 is a flowchart illustrating a process of a display control processing program executed by the controller 38 of the smartphone 10 when an instruction for executing the process is input through the operation panel 14B or the operation unit 20. The program is stored in advance in a certain area of the internal memory 28A.

To avoid confusion, a description will be given of the case where plural pieces of image information are stored in the memory 28.

In step S100, the controller 38 performs control to display on the display panel 14A a menu screen 42 from which a screen transition occurs.

Figure 4A:
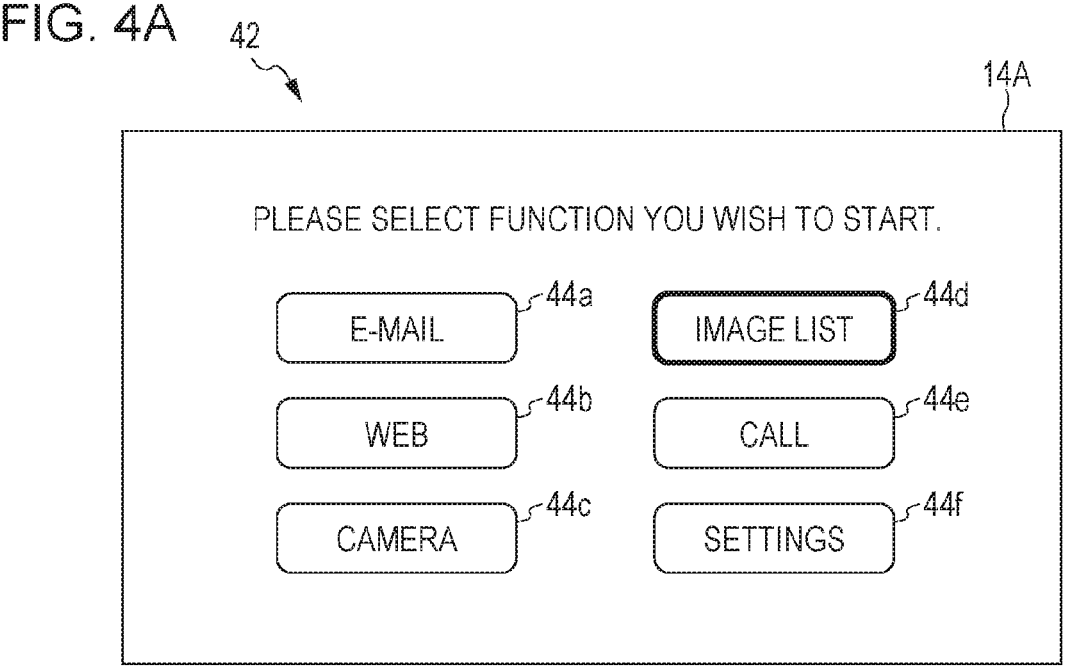
FIGS. 4A and 4B illustrate example configurations of a screen displayed by the execution of the display control processing program according to the exemplary embodiment.

FIG. 4A illustrates an example of the menu screen 42 according to this exemplary embodiment. As illustrated in FIG. 4A, the menu screen 42 has menu buttons. The menu buttons include, for example, an "e-mail" button 44a used to instruct start of the e-mail function, a "web" button 44b used to instruct start of the web browsing function, a "camera" button 44c used to instruct start of the camera function, an "image list" button 44d used to instruct start of the image list function, a "call" button 44e used to instruct start of the function of making a call, and a "settings" button 44f used to instruct start of various setting functions.

The user touches a desired one of the menu buttons on the menu screen 42 to select the associated menu item. Accordingly, the controller 38 starts the function corresponding to the selected menu button.

In step 101, the process waits for the user to select a menu button. Then, in step 102, the controller 38 determines whether the menu button selected by the user is the "image list" button 44d or not. If NO is selected, the process proceeds to step S103. In step S103, the controller 38 executes the function corresponding to the selected menu button, and then terminates the program. If YES is selected, the process proceeds to step S104.

In step S104, the controller 38 acquires a predetermined division number from the memory 28. In this exemplary embodiment, information indicating the predetermined division number (for example, three) is input in advance by user operation, and is stored in the memory 28, which is non-limiting. That is, the division number may be derived in accordance with at least one of the size of the display panel 14A and the number of images stored in the memory 28, and may be input by a user through the operation panel 14B when the "image list" button 44d is selected.

Then, in step S105, the controller 38 reads all the pieces of image information stored in the memory 28, and enlarges or reduces each of the images represented by the individual pieces of image information so that the length of the image in the up-down direction in front view is equal to or substantially equal to the length of each of sub-areas in the up-down direction in front view into which the display area of the display panel 14A is divided in the up-down direction in accordance with the division number while the aspect ratios of the images are maintained. The term "substantially equal to", as used herein, is used to include the case where an error in display position of a display apparatus occurs or the case where the outer frame of an image does not exactly coincide with the outer frame of a sub-area but there is a play space therebetween.

In this exemplary embodiment, the display area is equally divided in the up-down direction in front view, which is non-limiting. The display area may be divided into sub-areas so that the lengths of the sub-areas in the up-down direction in front view differ. In this case, each of the images is enlarged or reduced so that the length of the image in the up-down direction in front view is equal to or substantially equal to the length of the sub-area where the image is displayed in the up-down direction in front view.

Then, in step S106, the controller 38 performs control to display on the display panel 14A the individual images obtained through the process described above.

Figure 4B:
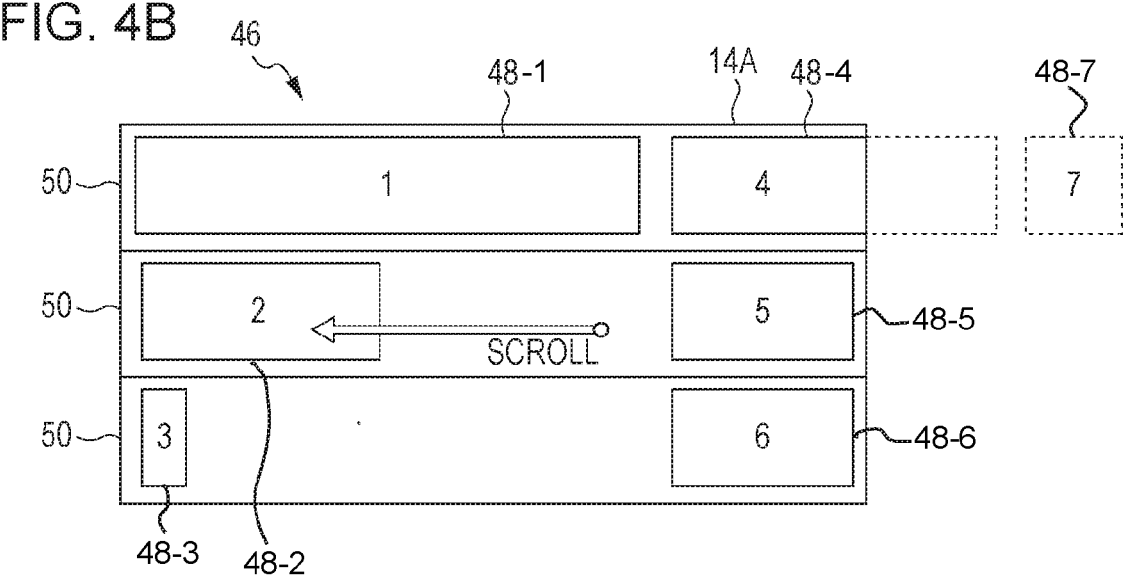

Thus, as an example, as illustrated in FIG. 4B, plural images 48 are displayed on an image list screen 46 so that each of the images 48 is enlarged or reduced so as to fit in each of sub-areas 50 into which the image list screen 46 is divided in the up-down direction in front view in accordance with a predetermined division number in such a manner that the length of the image 48 in the up-down direction in front view is equal to or substantially equal to the length of the sub-area 50 in the up-down direction in front view while the aspect ratios of the images 48 are maintained. The images 48 illustrated in FIG. 4B are images represented by the respective pieces of image information stored in the memory 28.

Then, in step S107, the controller 38 determines whether or not an instruction for scrolling the display area on the display panel 14A has been given by user operation. When a user's finger moves in a direction perpendicular to the direction in which the display area is divided (in this exemplary embodiment, up-down direction in front view) while in contact with the operation panel 14B, the controller 38 determines that that a scroll instruction in accordance with the movement has been given.

Figure 5A:
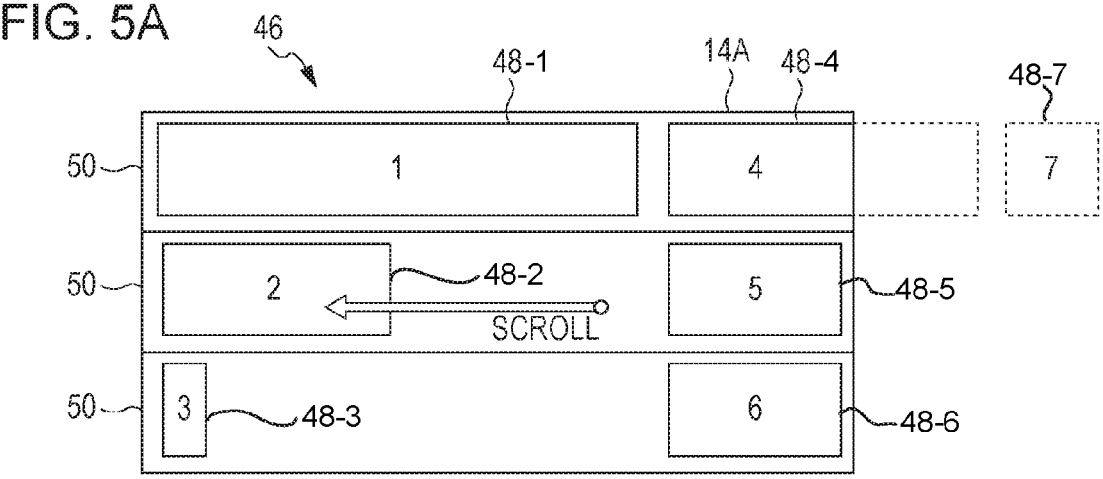
FIGS. 5A to 5C illustrate example configurations of a screen displayed by the execution of the display control processing program according to the exemplary embodiment.

If it is determined in step S107 that a scroll instruction has been given, the process proceeds to step S109. In step S109, the controller 38 determines whether or not the images displayed on the display panel 14A include an image having a free area located at the rear in the scroll direction. For example, as illustrated in FIG. 5A, if an instruction for scrolling the display area to the left in front view has been given, it is determined whether or not each image has a free area on the right side thereof in front view. In the example illustrated in FIG. 5A, the first image 48-1 has substantially no free area on the right side thereof in front view, whereas the second and third images 48-2 and 48-3 have free areas on the right side thereof in front view since the second and third images 48-2 and 48-3 are shorter than the first image 48-1 in the right-left direction in front view.

If it is determined in step S109 that an image having a free area is included, the process proceeds to step S111. In step S111, the controller 38 performs control to perform a scroll display process on only an image determined to have substantially no free area.

Figure 5B:
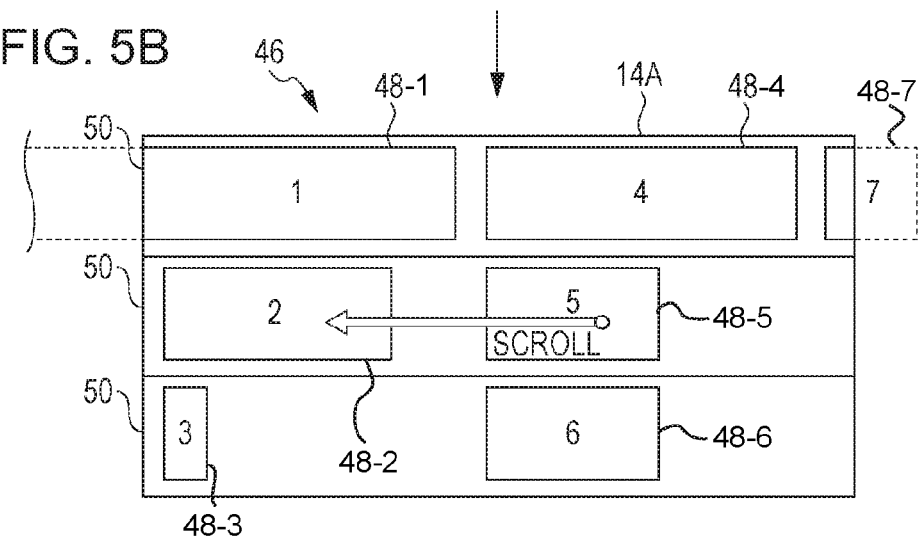

For example, as illustrated in FIGS. 5A and 5B, since the first image 48-1 has substantially no free area on the right side thereof in front view, only the first image 48-1 is scrolled. Since the second and third images 48-2 and 48-3 have free areas on the right side thereof in front view, the second and third images 48-2 and 48-3 are not scrolled.

If it is determined in step S109 that an image having a free area is not included, the process proceeds to step S113. In step S113, the controller 38 performs control to perform a scroll display process to scroll all the images.

In step S115, the controller 38 determines whether or not an image has been scrolled a certain amount or more in the scroll display process in step S111 or S113. If it is determined in step S115 that an image has not been scrolled the certain amount or more, the process returns to step S109.

Figure 5C:
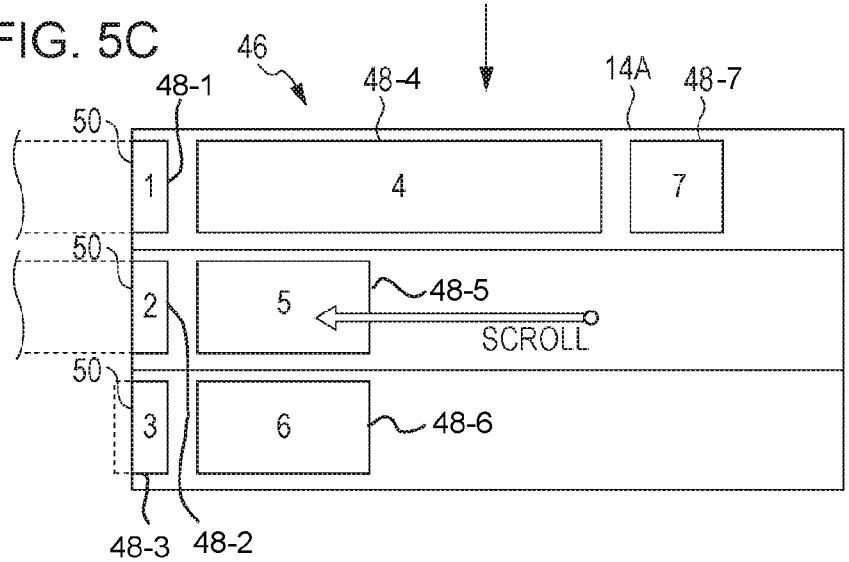

For example, as illustrated in FIGS. 5A to 5C, it is assumed that as a result of scrolling only the first image 48-1 having substantially a free area on the right side thereof in front view, there is substantially no free area on the right side of the second and third images 48-2 and 48-3 in front view. In this case, the first to third images 48-1 to 48-3 are scrolled. Further, the fourth to sixth images 48-4 to 48-6 are also scrolled in a manner similar to that described above.

If it is determined in step S115 that an image has been scrolled the certain amount or more, the process proceeds to step S117. In step S117, the controller 38 determines whether or not an input operation has been made through the operation units 20 to instruct the termination of the display control processing program. If it is determined in step S117 that such an input operation has not been made, the process returns to step S107.

If it is determined in step S117 that an input operation has been made to instruct the termination of the display control processing program, then, in step S119, the controller 38 performs control to terminate the display of the image list screen 46 on the display panel 14A, and then terminates the display control processing program.

Accordingly, the smartphone 10 according to this exemplary embodiment stores plural sets of information each set including image information indicating an image to be displayed on the display panel 14A, which serves as a display, and at least one attribute concerning the image information in such a manner that the image information and the at least one attribute are associated with each other. Further, when one of plural images displayed on the display is selected, it is determined whether or not the stored image information includes image information stored in association with an attribute relevant to an attribute associated with the selected image. Further, when plural images are displayed on the display in accordance with the stored image information and a relevant image based on image information determined to be included in the stored image information is displayed on the display, display control is performed so that a mark indicating a relevant image is displayed for the relevant image displayed on the display. Thus, visibility may be improved when plural images are displayed side by side on a single display area.

Figure 6A:
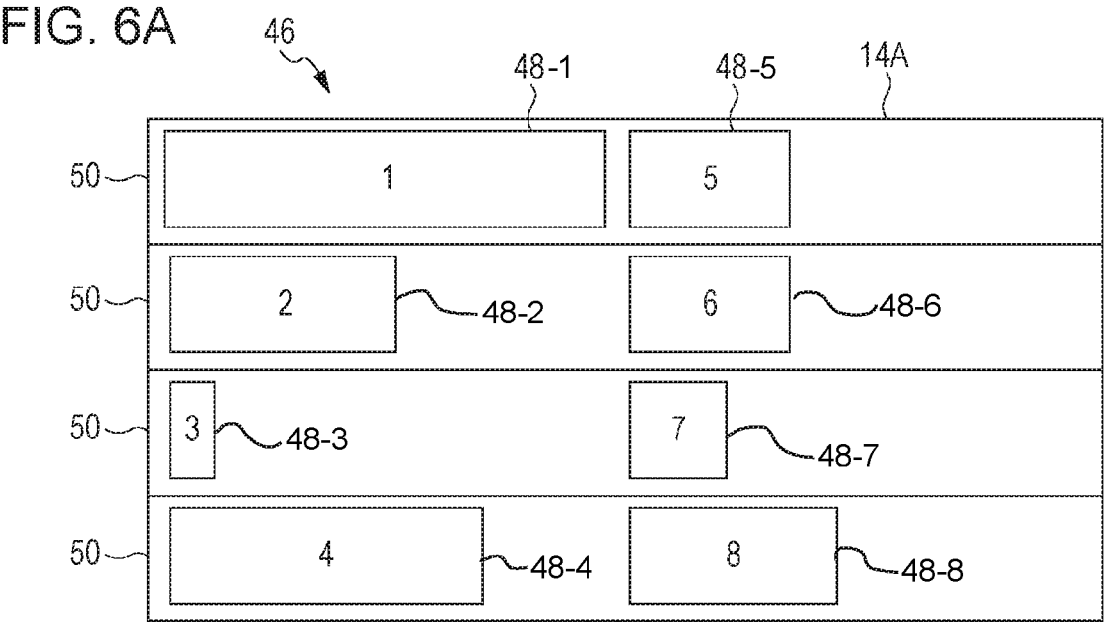
FIGS. 6A and 6B illustrate another example configuration of a screen displayed by the execution of the display control processing program according to the exemplary embodiment.
Figure 6B:
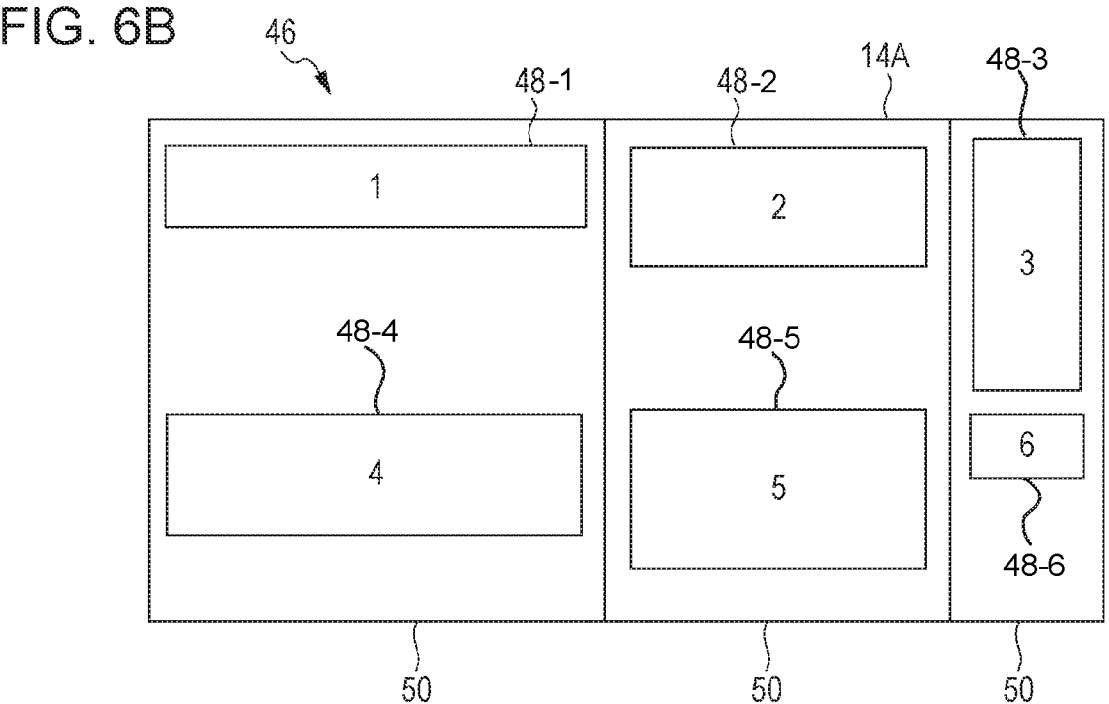

In this exemplary embodiment, the display area of the display panel 14A, which is formed in a rectangular shape, is divided into three sub-areas in the up-down direction in front view, which is non-limiting. As an example, as illustrated in FIG. 6A, the display area may be divided into plural (in FIG. 6A, four) sub-areas, except three sub-areas, in the up-down direction in front view. In this exemplary embodiment, furthermore, the display area is divided in the up-down direction in front view, which is non-limiting. As illustrated in FIG. 6B, the display area may be divided in the right-left direction in front view.

In this exemplary embodiment, furthermore, the display area of the display panel 14A is divided in the up-down direction in front view to display images, which is non-limiting. For example, the attitude of the smartphone 10 may be identified by the motion sensor unit 34, and, for example, the display area may be divided in its lengthwise direction in accordance with the attitude of the smartphone 10. In this case, images displayed in the same sub-area are displayed so as to be arranged side by side in the widthwise direction of the display area. This allows the user to view the individual images, when all the images are not displayed on the same screen, by scrolling the displayed images in the widthwise direction. This allows the user to view the individual images, when all the images are not displayed on the same screen, by scrolling the displayed images in the widthwise direction.

Figure 7A:
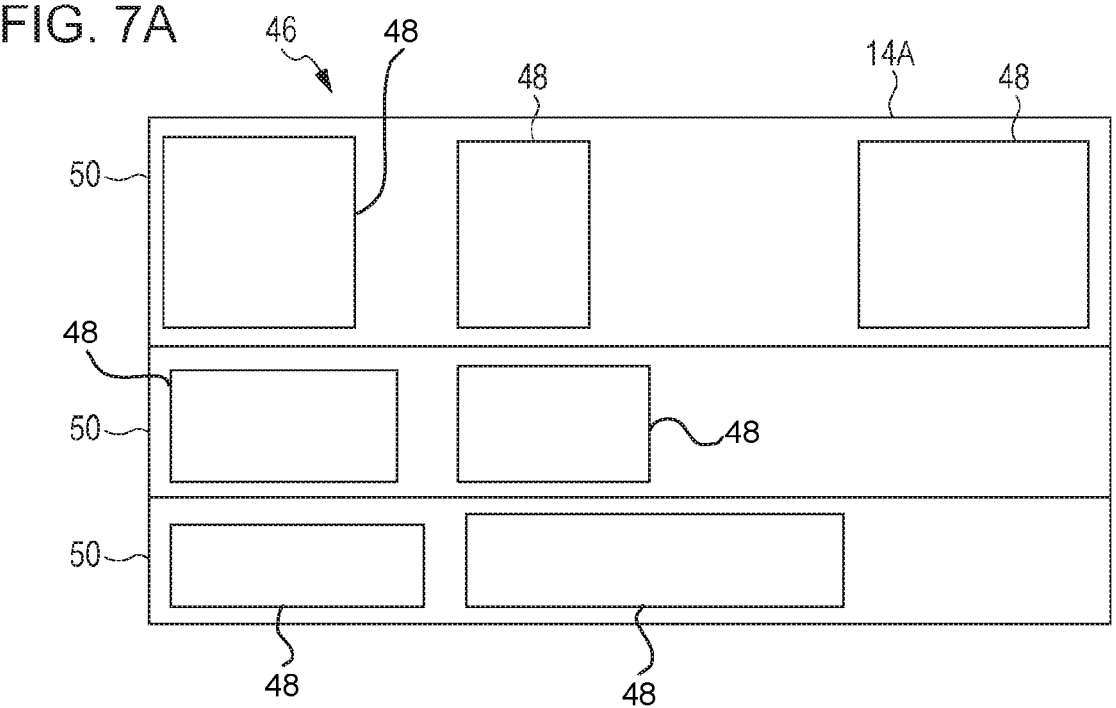
FIGS. 7A and 7B illustrate another example configuration of a screen displayed by the execution of the display control processing program according to the exemplary embodiment.

In this exemplary embodiment, furthermore, the images 48 are sequentially arranged in the sub-areas, starting from the first image 48, which is non-limiting. The arrangement of the individual images image may be determined in accordance with the shapes of the images. Specifically, as illustrated in FIG. 7A, the display area may be divided into plural sub-areas in such a manner that the lengths of the sides of the sub-areas in a direction in which one side of the display area extends are different, and plural images are displayed in the sub-areas in accordance with the aspect ratios of the images so that an image which is more landscape is displayed in a sub-area having shorter sides in the direction in which the one side of the display area extends. Thus, the individual images may be arranged in appropriate sub-areas in accordance with their aspect ratios.

Figure 7B:
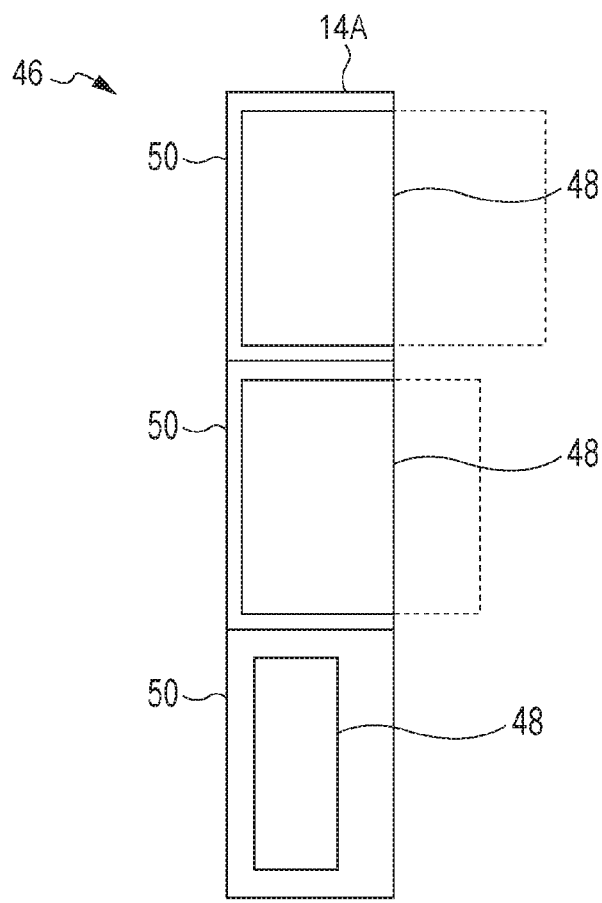
Figure 8:
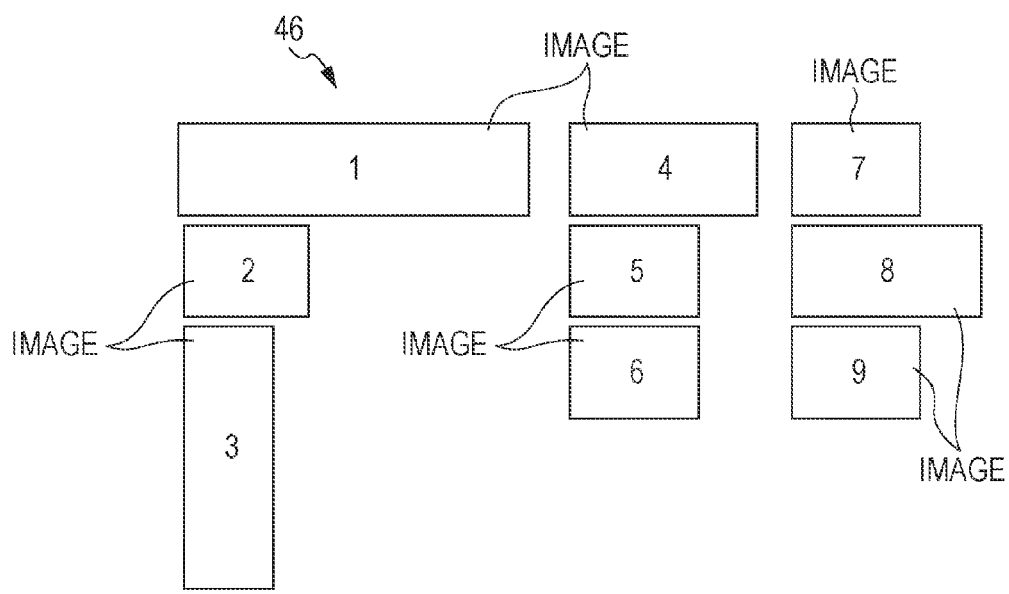
FIG. 8 is a schematic diagram illustrating an example of shapes of images stored in a smartphone of the related art.
Figure 9:
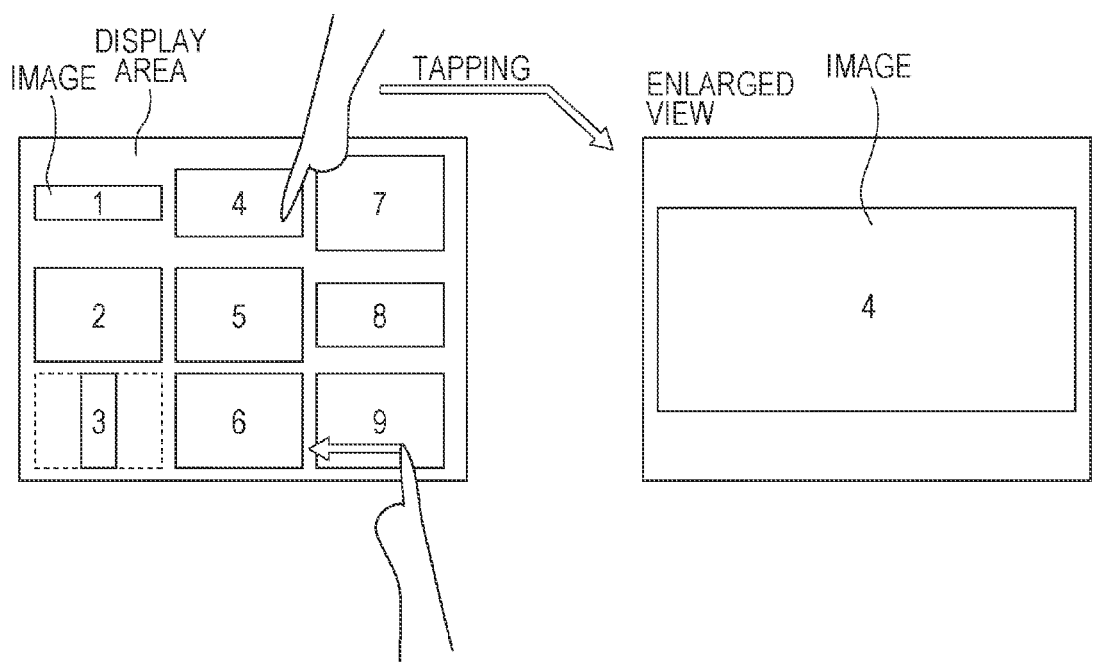
FIG. 9 is a schematic diagram illustrating an example of a screen displayed on the smartphone of the related art.

In this exemplary embodiment, furthermore, the short sides of the display area are divided (that is, the display area is divided in the up-down direction in front view), which is non-limiting. Specifically, as illustrated in FIG. 7B, the long sides of the display area may be divided (that is, the display area may be divided in the up-down direction in front view in FIG. 7B). Thus, even if the display area is elongated, images may be displayed.

In this exemplary embodiment, furthermore, the display area of the display panel 14A, which is formed in a rectangular shape, is divided in accordance with a predetermined division number in the up-down direction in front view, which is non-limiting. The number of sub-areas may be determined so that an enlargement ratio or reduction ratio at which the plural images stored in the memory 28 are enlarged or reduced is within a predetermined range. This may prevent the individual images from being reduced at a reduction ratio higher than a predetermined reduction ratio.

While the foregoing exemplary embodiment is implemented by software executed by a computer program, the present invention is not limited to the foregoing exemplary embodiment. It is to be understood that some exemplary embodiments of the present invention may be implemented only by hardware or by a combination of hardware and software.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display control apparatus comprising:
  a memory comprising computer executable instructions; and
  at least one processor configured to execute the computer executable instructions, the computer executable instructions causing the at least one processor to:
  divide a display area into a plurality of divided areas;
  enlarge or reduce images, while maintaining aspect ratios of the images, such that, for each image, a length of the image in a first direction is substantially equal to a length, in the first direction, of a respective one of the divided areas into which the image is to be displayed;
  perform display control to display the images that have been enlarged or reduced in the respective divided areas;
  detect a scroll direction in which a user instructs to scroll the displayed images; and
  for each divided area, perform control to:
    when a free area within a divided area is present upstream of a displayed image in the scroll direction, to not scroll the displayed image but to scroll in the scroll direction images that are upstream of the free area in the divided area, and when a free area within a divided area is not present upstream of a displayed image in the scroll direction, to scroll the displayed images in the divided area in the scroll direction within the divided area.

2. The image display control apparatus according to claim 1, wherein a portion of the enlarged or reduced images are not initially displayed in the divided areas but are to be displayed in respective divided areas, and wherein the computer executable instructions further cause the at least one processor to:

for each divided area, when the free area within the divided area is present upstream of the displayed image in the scroll direction, to scroll in the scroll direction images that are not initially displayed in the divided area but are to be displayed in the divided area such that the images are displayed within the divided area, and when the free area within the divided area is not present upstream of the displayed image in the scroll direction, to scroll the displayed images in the divided area in the scroll direction within the divided area and images that are not initially displayed in the divided area but are to be displayed in the divided area such that the images are displayed within the divided area.

3. The image display control apparatus according to claim 1, wherein the computer executable instructions further cause the at least one processor to:

divide the display area into the plurality of the divided areas along a short side of the display area.

4. The image display control apparatus according to claim 1, wherein the computer executable instructions further cause the at least one processor to:

divide the display area into the plurality of the divided areas along a long side of the display area.

5. The image display control apparatus according to claim 1, wherein at least one divided area has a length, in the first direction, that is different than lengths of the remaining divided areas in the first direction.

6. The image display control apparatus according to claim 1, wherein a number of the plurality of divided areas is determined such that an enlargement ratio or reduction ratio at which the images are enlarged or reduced is within a predetermined range.

7. The image display control apparatus according to claim 1, wherein the display area comprises a touch panel on a surface thereof, and the scroll direction is detected in accordance with an input received from the touch panel.

8. An image display apparatus comprising:

the image display control apparatus according to claim 1; and a display configured to display an image, the display including a touch panel through which information for selecting a displayed image is input.

9. An image display apparatus comprising:

the image display control apparatus according to claim 1;

a display configured to display an image; and an input device configured to receive an input of information for selecting an image.

10. The image display control apparatus according to claim 1, wherein each of the divided areas has a same length in the first direction.

11. The image display control apparatus according to claim 1, wherein the first direction is an up-down direction in a front view of the display area.

12. The image display control apparatus according to claim 1, wherein the first direction is a right-left direction in a front view of the display area.

13. A non-transitory computer readable medium storing a program causing a computer to execute a process, the process comprising:

dividing a display area into a plurality of divided areas;

enlarging or reducing images, while maintaining aspect ratios of the images, such that, for each image, a length of the image in a first direction is substantially equal to a length, in the first direction, of a respective one of the divided areas into which the image is to be displayed;

performing display control to display the images that have been enlarged or reduced in the respective divided areas;

detecting a scroll direction in which a user instructs to scroll the displayed images; and for each divided area, performing control to:

when a free area within a divided area is present upstream of a displayed image in the scroll direction, to not scroll the displayed image but to scroll in the scroll direction images that are downstream of the free area in the divided area, and when a free area within a divided area is not present upstream of a displayed image in the scroll direction, to scroll the displayed images in the divided area in the scroll direction within the divided area.

14. An image display method comprising:

dividing a display area into a plurality of divided areas;

enlarging or reducing images, while maintaining aspect ratios of the images, such that, for each image, a length of the image in a first direction is substantially equal to a length, in the first direction, of a respective one of the divided areas into which the image is to be displayed;

performing display control to display the images that have been enlarged or reduced in the respective divided areas:

detecting a scroll direction in which a user instructs to scroll the displayed images; and for each divided area, performing control to:

when a free area within a divided area is present upstream of a displayed image in the scroll direction, to not scroll the displayed image but to scroll in the scroll direction images that are upstream of the free area in the divided area, and when a free area within a divided area is not present upstream of a displayed image in the scroll direction, to scroll the displayed images in the divided area in the scroll direction within the divided area.

* * * * *